US 12,219,982 B2

(12) United States Patent
Hughes et al.

(10) Patent No.: US 12,219,982 B2
(45) Date of Patent: Feb. 11, 2025

(54) EXTRUSION SYSTEM

(71) Applicant: Frazer-Nash Manufacturing Limited, Petersfield (GB)

(72) Inventors: John Lawrence Hughes, Southampton (GB); Stephen Jeffrey Plas, Louisville, KY (US); Matthew Cottam, Alton (GB); Stephen Terence Frederick Lewis, Alresford (GB); Paul Alan Robert Mortlock, Guildford (GB)

(73) Assignee: Frazer-Nash Manufacturing Limited, Petersfield (GB)

( * ) Notice: Subject to any disclaimer, the term of this patent is extended or adjusted under 35 U.S.C. 154(b) by 786 days.

(21) Appl. No.: 17/367,047

(22) Filed: Jul. 2, 2021

(65) Prior Publication Data
US 2023/0000129 A1    Jan. 5, 2023

(51) Int. Cl.
 *B29C 48/00* (2019.01)
 *A23P 30/20* (2016.01)
 *B29C 48/255* (2019.01)
 *B29C 48/68* (2019.01)
 *B29C 48/80* (2019.01)

(52) U.S. Cl.
 CPC .......... *A23P 30/20* (2016.08); *B29C 48/2552* (2019.02); *B29C 48/681* (2019.02); *B29C 48/80* (2019.02)

(58) Field of Classification Search
 CPC ... A23P 30/20; B29C 48/681; B29C 48/2552; B29C 48/80
 See application file for complete search history.

(56) References Cited

U.S. PATENT DOCUMENTS

| | | | | |
|---|---|---|---|---|
| 4,213,747 | A | * | 7/1980 | Friedrich ................ B29B 7/728 425/146 |
| 5,747,077 | A | * | 5/1998 | Yoshida ................ B29C 48/05 425/185 |
| 2004/0043094 | A1 | | 3/2004 | Hauck et al. |

FOREIGN PATENT DOCUMENTS

| | | |
|---|---|---|
| DE | 102005007102 A1 | 8/2006 |
| DE | 202014005235 U1 | 7/2014 |
| EP | 0774332 A2 | 5/1997 |
| WO | 2020247215 A1 | 12/2020 |

OTHER PUBLICATIONS

European Search Report dated Nov. 21, 2022 for European Application No. 22182349.5.

* cited by examiner

*Primary Examiner* — Anshu Bhatia
(74) *Attorney, Agent, or Firm* — EIP US LLP

(57) ABSTRACT

An extrusion system, for example for extruding a food product, that includes: an extruder, which propels extrudate through an outlet of the extruder; and a valve. The valve includes: an inlet, which receives extrudate from the extruder outlet; a main conduit, which extends from the inlet to a main outlet; a dumping conduit, which extends from a junction with the main conduit to a dumping outlet; and a flow control member, which is operable to move between: a plurality of flow controlling positions, in which extrudate is directed to the main outlet, with the flow control member providing, for each flow controlling position, a respective amount of impedance to flow along the main conduit; and a flow diverting position, in which extrudate is directed along the dumping conduit to the dumping outlet.

16 Claims, 4 Drawing Sheets

EXTRUSION SYSTEM

BACKGROUND OF THE INVENTION

Field of the Invention

The present disclosure relates to extrusion systems and, in particular, to food extrusion systems, that is, systems that extrude a food product for human or animal consumption. Particular examples relate to food extrusion systems that cook the food product being extruded.

Description of the Related Technology

Use of extrusion systems in food preparation is widespread, with a wide variety of human and animal food products being made by extrusion, from snack foods and cheese products, to pet food. Consequently, many examples of systems for extruding food products are known in the art. However, challenges remain in providing extrusion systems that can operate efficiently (e.g. with little or no downtime) and that produce food products with desired characteristics, for example in terms of sanitation and/or nutritional quality and/or taste/palatability.

SUMMARY

According to a first aspect of the disclosure, there is provided an extrusion system comprising: an extruder, operable to propel extrudate through an outlet thereof, during use; and a valve, which comprises: an inlet, fluidically connected to the extruder outlet, so as to receive extrudate therefrom, during use; a main conduit extending from the inlet to a main outlet; a dumping conduit, extending from a junction with the main conduit to a dumping outlet; and a flow control member, operable to move between: a plurality of flow controlling positions, in which extrudate is directed to the main outlet, with the flow control member providing, for each flow controlling position, a respective amount of impedance to flow along said conduit; and a flow diverting position, in which extrudate is directed along the dumping conduit to the dumping outlet.

According to a further aspect of the disclosure, there is provided a valve for an extrusion system comprising: an inlet, configured for connection to an outlet of an extruder, so as to receive extrudate therefrom, during use; a main conduit extending from the inlet to a main outlet; a dumping conduit, extending from a junction with the main conduit to a dumping outlet; and a flow control member, operable to move between: a plurality of flow controlling positions, in which extrudate is directed to the main outlet, with the flow control member providing, for each flow controlling position, a respective amount of impedance to flow along said conduit; and a flow diverting position, in which extrudate is directed along the dumping conduit to the dumping outlet.

Further features and advantages will become apparent from the following description, given by way of example only, which is made with reference to the accompanying drawings.

BRIEF DESCRIPTION OF THE DRAWINGS

Further features will become apparent from the following description, given by way of example only, which is made with reference to the accompanying drawings, in which.

DETAILED DESCRIPTION

Details of apparatus and kits according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

Examples described herein relate to extrusion systems and, more particularly, to food extrusion systems, i.e. systems that extrude a food product.

Figure 1A:
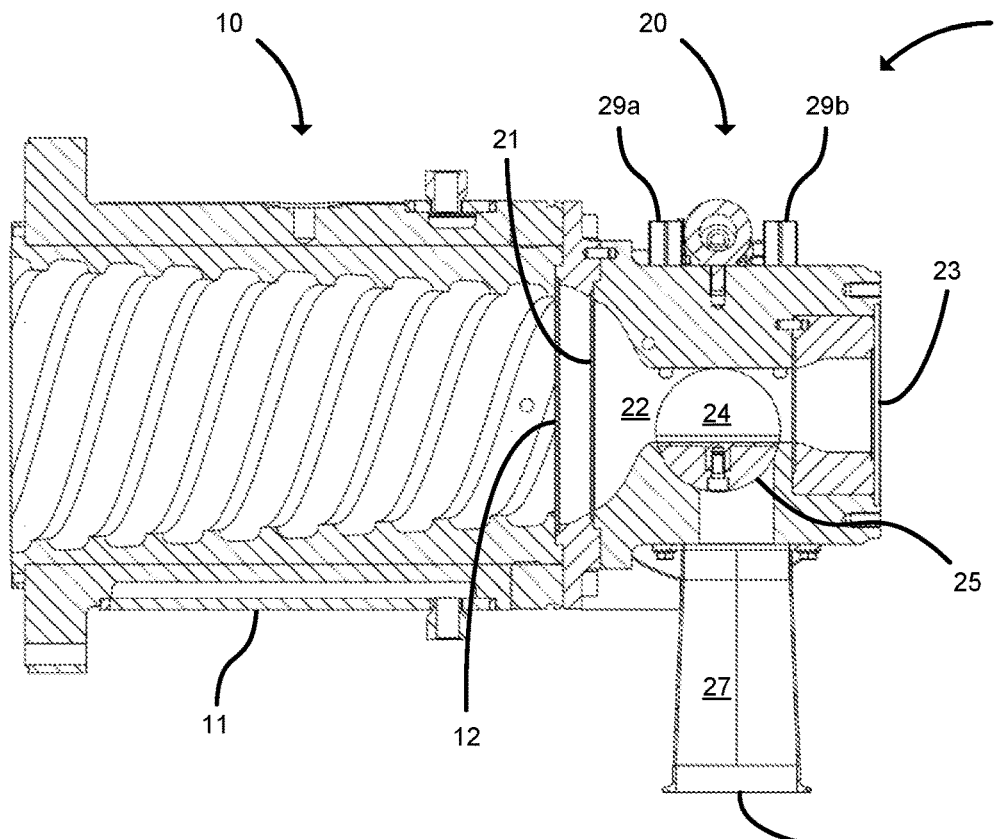
FIG. 1A shows a sectional view of an extrusion system in accordance with a first example embodiment of the present disclosure, the section being taken along the length of an extruder barrel of the system.
Figure 1B:
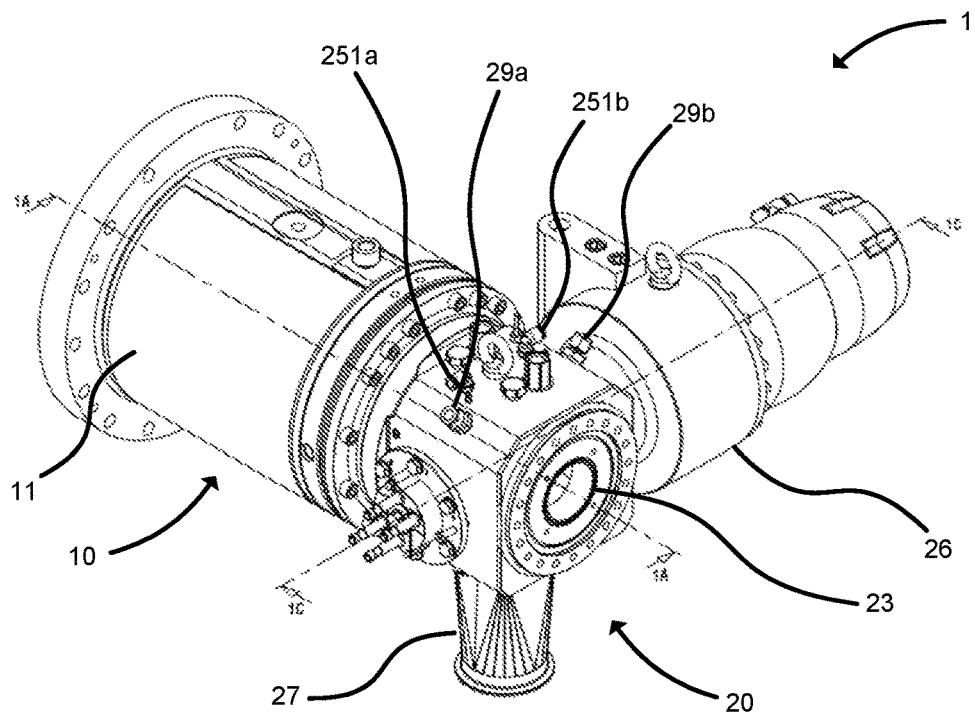
FIG. 1B shows a perspective view of the system of FIG. 1A.

Attention is directed firstly to FIGS. 1A and 1B, which show, respectively, a sectional view and a perspective view of an example embodiment of an extrusion system 1. The plane in which the section of FIG. 1A is taken is indicated in FIG. 1B.

As shown in FIGS. 1A and 1B, the extrusion system 1 includes an extruder 10, which is operable to propel extrudate through an outlet 12, during use. The extrudate may be a food product, for example containing protein and/or starch, and may for example be: an animal food product such as petfood kibble, treats, fish food, or general animal feed; or a human food product, such as a breakfast cereal, or a snack product. In some examples, the food product may be a cooked food product. As shown, the outlet 12 may, for example, be located at a longitudinal end of the extruder 10. As also shown, the extruder 10 may, for example, include a barrel 11 and may include one or two (or potentially more) extrusion screws provided within the extruder barrel 11. Such extrusion screws are not shown in the drawings for clarity, but are typically configured such that they are each rotatable about a respective axis parallel to the length of the extruder barrel 11. The interior surface of extruder barrel 11 may have a shape that is complementary to such screws, where used. For example, where one screw is disposed within barrel 11, the barrel 11 may have a helical groove on its interior surface, as shown in FIG. 1A.

During use of the extrusion system 1, a food product may be cooked within extruder barrel 11, for example under significant pressure (e.g. 10-20 bar). Hence (or otherwise), the extruder 10 may include a heat exchanger, which may, for example comprise piping surrounding the barrel 11 that conveys steam during use, with heat being transferred from the steam to the contents of the barrel 11.

Returning to FIGS. 1A and 1B, it may be noted that the extrusion system 1 further includes a valve 20. The features of this valve are shown clearly in the sectional view of FIG. 1A and will be discussed in detail below.

As may be seen from FIG. 1A, valve 20 includes an inlet 21, which is fluidically connected to the extruder barrel outlet 12. Consequently, the valve inlet 21 receives extrudate from the extruder 10, during use. As may also be seen from FIG. 1A, the valve 20 further includes a main conduit 22, which extends from the valve inlet 21 to an outlet 23. In some embodiments, the system 1 may comprise an extrusion die that is mounted on valve 20 and receives extrudate from main outlet 23. Such an extrusion die will typically have multiple apertures from which extrudate is extruded. The system may further include a cutting assembly, for example comprising a rotating blade, that is operable to cut the output from each aperture into food items of desired length.

In the particular example shown, the cross-sectional area of the portion of the main conduit 22 leading from the valve inlet 21 decreases with distance from the valve inlet 21, before reaching a portion of the main conduit 22 where a flow control member 25 is located. However, this is by no means essential and the portion of the main conduit 22 leading from the valve inlet 21 could be shaped differently, for example having substantially constant cross-section.

In addition to main conduit 22, valve 20 includes a dumping conduit 27. As may be seen from FIG. 1A, this dumping conduit 27 extends from a junction 24 with the main conduit 22 to a dumping outlet 28. The main conduit and dumping conduit might therefore be described as being in a fixed arrangement relative to one another. As shown in FIG. 1A, the junction 24 may, for example, be located part-way along the length of the main conduit 22. As illustrated, the dumping conduit 27 may, in some examples, extend generally perpendicularly to the main conduit 22. As will be explained in further detail below, dumping conduit 27 may be used to discard extrudate, for example because it is unwanted or potentially contaminated, or in order to relieve pressure within the extruder 10. A hopper can be placed beneath the dumping outlet 28 to collect the discarded extrudate.

Referring again to FIG. 1A, valve 20 further includes a flow control member 25. In the particular example shown, the flow control member 25 is located at the junction 24 of the main conduit 22 and the dumping conduit 27, though this is not essential. As will be explained below with reference to FIGS. 2A-2C, the flow control member 25 is moveable between a number of different positions to control the flow of extrudate within the main conduit 22 and the dumping conduit 27.

Figure 1C:
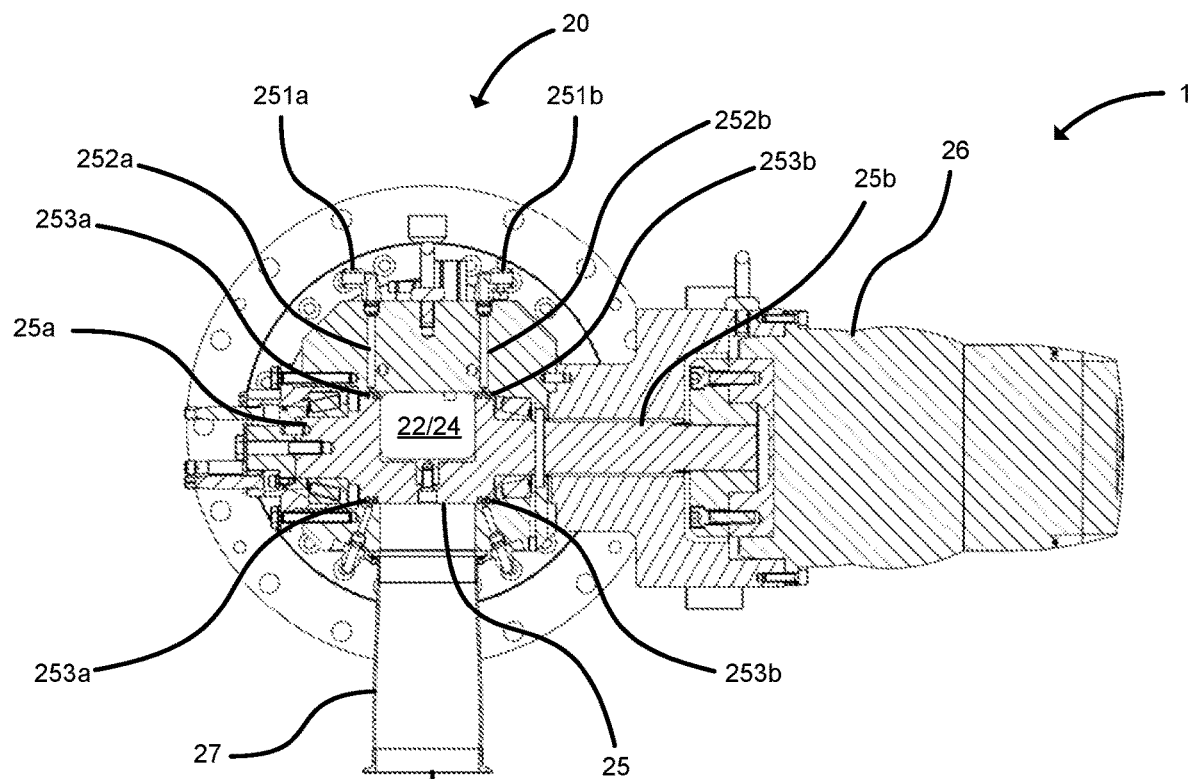
FIG. 1C shows a further sectional view of the extrusion system of FIGS. 1A and 1B, the section being taken in a plane perpendicular to the plane in which the section of FIG. 1A is taken.
Figure 3:
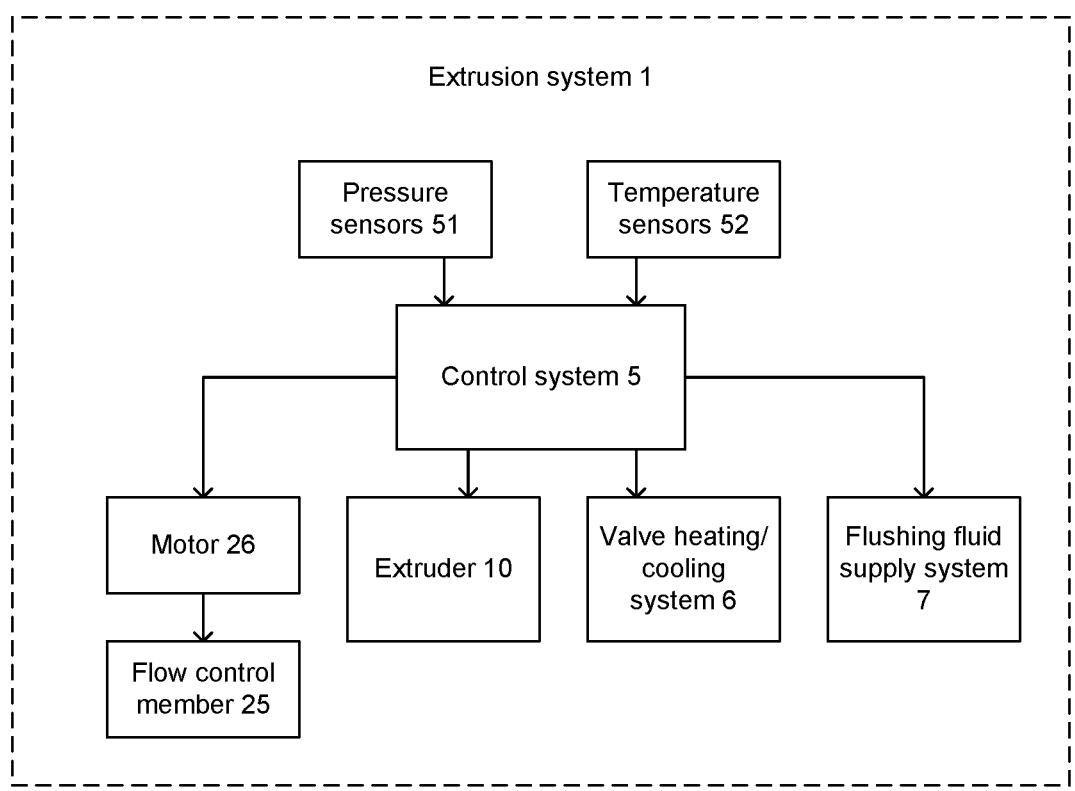
FIG. 3 is a schematic diagram showing various systems within the extrusion system of FIGS. 1A-1C.

In some embodiments, the valve 20 may include a motor 26 for moving the flow control member 25 between these positions. The motor 26 may, for example, be controlled by a control system 5 for the overall extrusion system 1, as illustrated in FIG. 3. Such a control system 5 may, for instance, comprise one or more processors that may, for example, receive user input from a control panel, or from a computer (e.g. by means of a user interface displayed to the user). Where a computer is used, it may provide some or all of the one or more processors of the control system 5. Such a motor 26 is shown in FIG. 1C, which is a further sectional view of the extrusion system of FIGS. 1A and 1B, with the section being taken in a plane perpendicular to the plane in which the section of FIG. 1A is taken. As is apparent from FIG. 1B, the section of FIG. 1A is taken in a plane in which the length of main conduit 22 lies, whereas the section of FIG. 1C is taken in a plane that is perpendicular to the length of main conduit 22 and passes through junction 24.

Figure 2A:
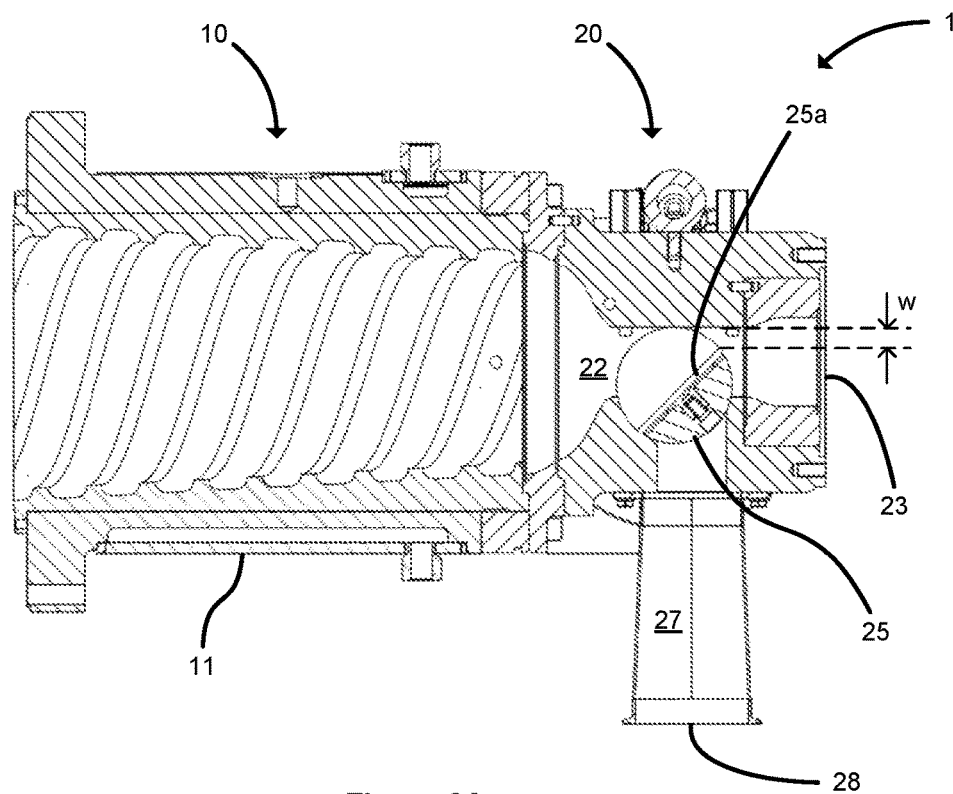
FIG. 2A shows a sectional view of the extrusion system of FIGS. 1A-1C, with a flow control member for a valve of the system in a flow controlling position.

Reference is now directed to FIG. 2A, which shows a similar sectional view of the extrusion system 1 to that shown in FIG. 1A. FIG. 1A and FIG. 2A show flow control member 25 in respective, different flow controlling positions. As is apparent from FIGS. 1A and 2A, in each such flow controlling position, extrudate is directed to main outlet 23. However, the flow control member 25 provides a respective, different amount of impedance to the flow of extrudate along the main conduit 22 in each flow controlling position. The different impedances may be used to control the specific mechanical energy and/or the pressure and/or the rate of flow in the extruder 10. In the particular example shown, these different impedances result from the movement of the flow control member 25 altering the width, w, and thus the area, of an opening or gap between flow control member 25 and the interior surfaces of main conduit 22. As may be appreciated from FIGS. 1A and 2A, once the extrudate passes this opening or gap, the interior surfaces of the main conduit 22 channel or guide the extrudate to the main outlet 23.

As is apparent from FIGS. 1A and 2A, flow control member 25 rotates about an axis to move between the flow controlling positions. In the particular example shown, each of the flow controlling positions corresponds to a flow-contacting surface 25a of the flow control member 25 being oriented at a respective angle with respect to a length of the main conduit 22. As shown, given that a significant amount of wear may occur on this flow-contacting surface 25a, it may, in some embodiments, be provided by a sacrificial member, which may be removed and replaced periodically.

It may be noted that the size of the gap/opening is at a maximum when the flow control member 25 is in the flow controlling position shown in FIG. 1A. Consequently, in this position (which might be described as an "open" position), the flow control member 25 presents a minimum amount of impedance, as compared with the other flow controlling positions. In this open position, at least one flow-contacting surface 25a of the flow control member 25 may, for example, be substantially continuous with the adjoining internal surfaces of the main conduit 22, as is shown in FIG. 2A. Such an arrangement may reduce the likelihood that portions of extrudate become stuck within the system 1, potentially leading to unsanitary conditions, and/or may simplify cleaning of the system 1.

As illustrated in FIG. 2A, in some embodiments, the flow control member 25 may be configured such that, in addition to directing extrudate to main outlet 23, it blocks or prevents the flow of extrudate to the dumping outlet 28 when it is disposed in any of the flow controlling positions.

Figure 2B:
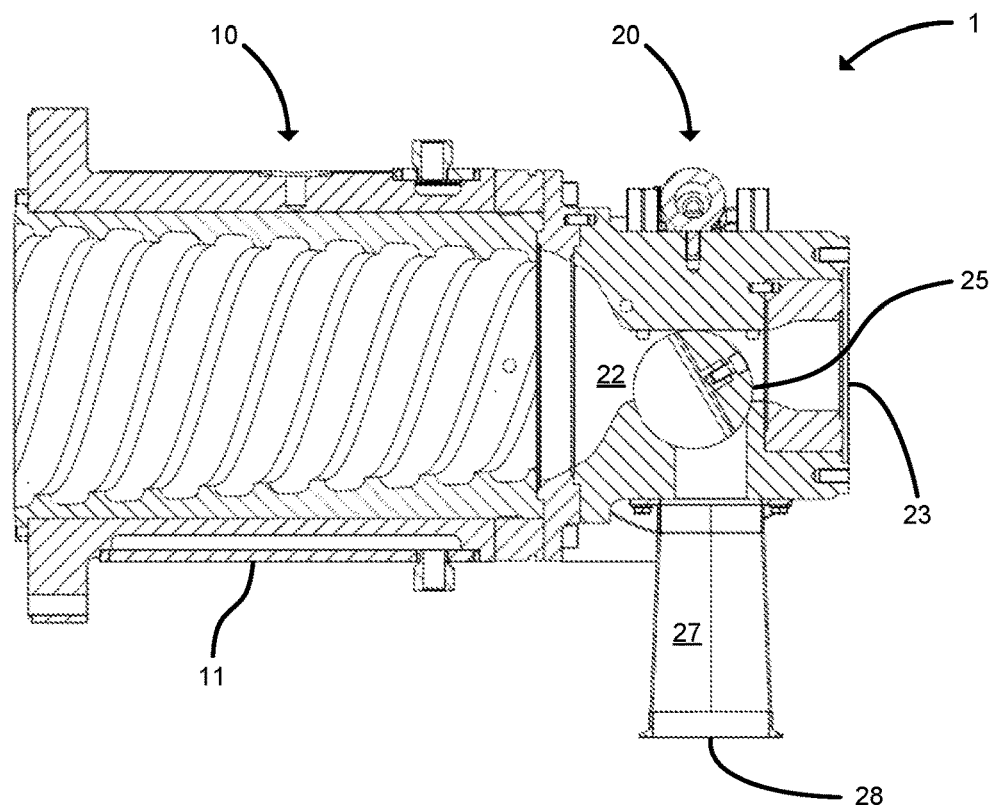
FIG. 2B shows a sectional view of the extrusion system of FIGS. 1A-1C, with the flow control member in a flow diverting position.

Reference is directed next to FIG. 2B, which shows a similar sectional view of the extrusion system 1 to those shown in FIGS. 1A and 2A, but with flow control member 25 in a flow diverting position. As is apparent from FIG. 2B, in such a flow diverting position, extrudate is directed so as to flow along the dumping conduit 27 to the dumping outlet 28. In some embodiments, the interior surfaces of the dumping conduit 27 might therefore be described as channeling, or guiding the extrudate to the dumping outlet 28. As illustrated in FIG. 2B, in such a flow diverting position the flow control member 25 may, in some embodiments, additionally block or prevent the flow of extrudate to the main outlet 23.

In the flow diverting position, dumping conduit 27 may be used to discard extrudate, for example because it is unwanted or because it is potentially contaminated. In particular examples, the system 1 (for example, using motor 26 under the control of control system 5) may move the flow control member 25 to such a flow diverting position during startup, for instance because the initial output from the extruder 10 may not be of sufficient quality. More particularly, in embodiments where the extruder 10 is configured to cook the extrudate, the initial output from the extruder 10 may not be sufficiently cooked to destroy toxins and/or kill pathogens. This may, in some cases, present a food safety issue. By moving the flow control member 25 to such a flow diverting position during startup of the cooking extruder 1, insufficiently cooked extrudate can be discarded.

In many embodiments, the extrusion system 1 may be configured (e.g. by suitable configuration of a control system 5 for the system 1) to move flow control member 25 to only one flow diverting position. However, the system 1 could instead be configured to move flow control member 25 between multiple flow diverting positions, for example with flow control member 25 providing a respective, different amount of impedance to the flow of extrudate to dumping outlet 28 in each flow controlling position.

Reference is now directed to FIGS. 2A and 2B. As may be appreciated, in the particular example shown, flow control member 25, main conduit 22 and dumping conduit 27 are shaped and arranged such that, as the flow control member 25 is moved from a flow controlling position to a flow diverting position, extrudate is at all times able to flow to at least one of main outlet 23 and dumping outlet 28. Such an arrangement avoids "dead-ending" the extruder 10, which can lead to the pressure within the extruder 10 spiking, which can be a safety concern.

Figure 2C:
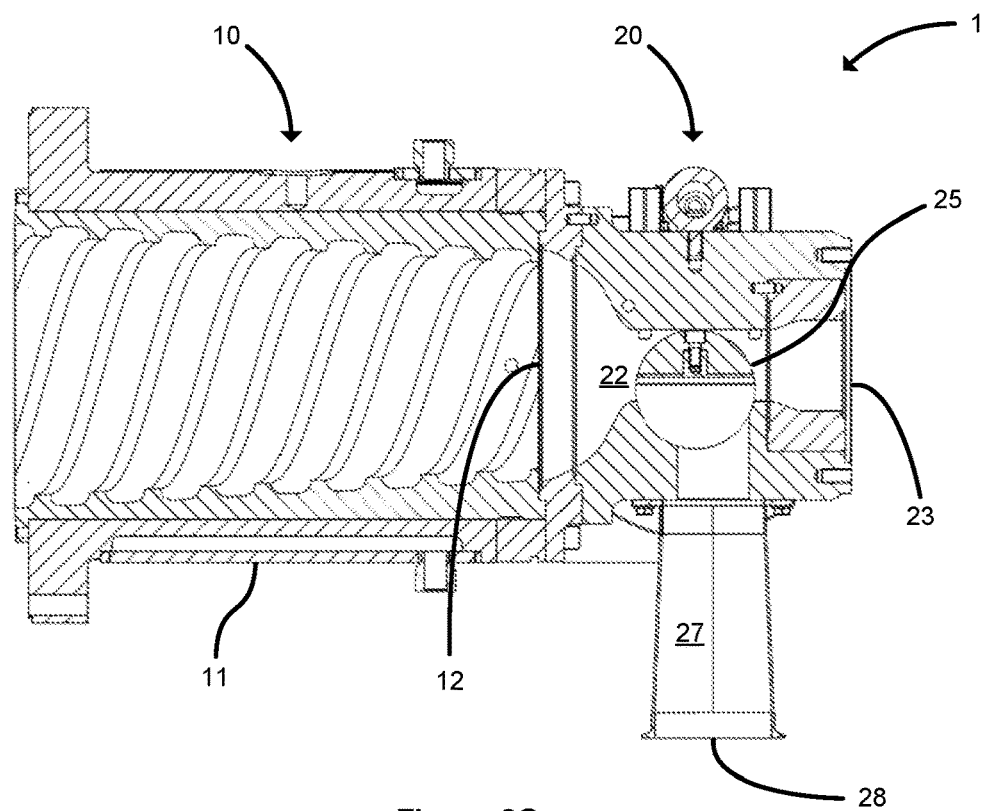
FIG. 2C shows a sectional view of the extrusion system of FIGS. 1A-1C, with the flow control member in a pressure release position.

Attention is now directed to FIG. 2C, which shows a similar sectional view of the extrusion system 1 to those shown in FIGS. 1A, 2A, and 2B, but with flow control member 25 in a pressure release position. It should be noted that it is strictly optional that the system 1 be configured to move the flow control member 25 to such a pressure release position; it is envisaged that suitable systems may be provided that are configured to move flow control member 25 to only flow controlling positions and a flow diverting position. Nevertheless, such a pressure release position may be of use to rapidly release pressure in the extruder 10 and/or the main conduit 22, for example where the system 1 (for instance, control system 5 thereof) determines that the pressure in the extruder barrel 11 has exceeded a maximum safe value and/or determines that the pressure in the main conduit adjacent the main outlet 23 has exceeded a maximum safe value. As is apparent from FIG. 2C, in the pressure release position, the extruder barrel outlet 12, the main outlet 23, and the dumping outlet 28 are all in fluid communication. In consequence, pressure accumulated within the extruder barrel 11 and the main conduit 22 can be rapidly released via dumping outlet 28.

As may be appreciated from FIGS. 1A-2C, the flow control member 25 shown is shaped so it at most partially encircles or surrounds extrudate, with respect to the direction of flow. Hence (or otherwise), flow control member 25 does not define an enclosed passageway for the extrudate. Such constructions may be particularly compact, yet still enable the flow control member 25 to suitably direct extrudate to a desired one of the main outlet 23 or dumping outlet 28. In the particular example shown in the drawings, where the flow control member 25 is rotatable, it is shaped such that, its cross-section, taken in a plane defined by length directions of the main 22 and dumping 27 conduits, is shaped generally as a segment of a circle.

Returning briefly to FIG. 1C, it may be noted that, in the particular embodiment shown, valve 20 further includes two ports 251a, 251b. These ports 251a, 251b are configured to receive a fluid (e.g. water) for flushing seals 253a, 253b for the flow control member 25. Such flushing may, for example, be carried out substantially continuously, during operation of the system 1. In such embodiments, the flushing fluid may carry away any extrudate that passes seals 253a, 253b, thus avoiding extrudate accumulating within the valve 20, and may lubricate seals 253a, 253b, reducing friction and increasing lifespan. Alternatively, such flushing might be carried out as part of a routine cleaning procedure for the system 1 that is, for example, performed periodically to maintain hygiene/sanitation requirements. Such seals 253a, 253b may, for example, assist in sealing extrudate within main conduit 22. In the specific example shown, flushing fluid is communicated to the seals 253a, 253b via internal conduits 252a, 252b. As shown, the ports 251a, 251b may, for example, be located on the exterior of the valve 20. Moreover, although two flushing ports 251a, 251b are shown, more or fewer ports could be included in other embodiments. More generally, although such ports 251a, 251b provide a convenient way of cleaning/flushing seals 253a, 253b, they are by no means essential and other approaches for cleaning the valve 20, and any seals it might have, are considered suitable.

Attention is now directed to FIG. 3, which is a schematic diagram showing various (sub)systems within the extrusion system 1 of FIGS. 1A-1C. As may be seen, the extrusion system 1 may, in some embodiments, include a control system 5, for example comprising one or more processors that may, for example, receive user input from a control panel, or from a computer (e.g. by means of a user interface displayed to the user). Where a computer is used, it may provide some or all of the one or more processors of the control system 5. As shown, such a control system 5 may regulate the functioning of other systems and devices within the overall extrusion system 1. For example, the control system 5 may control the operation of flow control member 25 (by controlling the operation of motor 26) and/or may control the operation of extruder 10. and/or a valve heating or cooling system 6, which may be configured to heat the contents of main conduit 22 or may be configured to cool its contents. More particularly, the operation of such systems and devices may be based on output received from pressure sensors 51 and/or temperature sensors 52, which may, for example, sense the pressure and/or temperature adjacent valve inlet 21 or pressure and/or temperature adjacent main outlet 23. For example, flow control member 25 may be moved to an appropriate flow controlling position in response to the output from such sensors. The control system 5 may operate to achieve or maintain desired conditions for the extrudate by simultaneously controlling the operation of extruder 10 (e.g. to apply a suitable force to extrudate within the extruder, given the desired conditions) and flow control member 25 (e.g. to provide a suitable level of impedance by selecting a suitable flow controlling position, given the desired conditions).

As shown in FIG. 3, the extrusion system 1 may optionally include one or more additional (sub)systems, such as: a valve heating or cooling system 6, which may be configured to heat the contents of main conduit 22 or may be configured to cool its contents); and/or a flushing fluid supply system 7, which, as described above with reference to FIG. 1C, may be configured to supply fluid to flush seals within valve 20, for example continuously or periodically.

In some embodiments, valve 20 may be configured as a heat exchanger, comprising at least one conduit 29a, 29b for conveying a heat transfer fluid to exchange heat with extrudate within the main conduit 22. In the specific embodiment shown, the valve 20 comprises an inlet conduit 29a and an outlet conduit 29b for conveying heat transfer fluid adjacent main conduit 22. In some embodiments (particularly, but not exclusively, where the extruder 10 is a cooking extruder), the heat transfer fluid may be at a higher temperature than the temperature of the extrudate in the main conduit 22, so that the temperature of the extrudate is maintained during passage through valve 20. Changes in the temperature of the extrudate can alter the structure of the extrudate, which may, in turn, impact palatability and/or other key requirements of the product. Steam is considered a suitable heat transfer fluid for supplying heat to extrudate within the main conduit 22. This is particularly the case in embodiments where steam is also used to heat the contents of the extruder barrel 11. In such embodiments, a single steam generation system can supply steam to conduits for heating the extruder 10 and to conduits for 29a, 29b heating the valve 20. Water and oil are also considered suitable heat transfer fluids and could be utilized in place of steam in further embodiments.

Although in the example above the heat exchanger acts to transfer heat to the extrudate in the main conduit 22, it should be appreciated that, in other embodiments, the heat exchanger could be configured to transfer heat away from the extrudate in the main conduit of valve 20, for example by using a suitable heat transfer fluid, such as cooled water.

In still further embodiments, the valve 20 might include a heater 6 instead of (or in addition to) a heat exchanger. Such a heater 6 might, for example, comprise one or more resistive heating elements that are operated during use to heat extrudate passing through the main conduit 22.

It may be noted that, in the particular example shown in FIGS. 1A-2C, flow control member 25 is rotatable about an axis to move between the flow controlling and flow diverting positions. More particularly, the flow control member 25 is rotatable about an axis that is perpendicular to the length of the main conduit 22 and. In such embodiments, the flow control member 25 may extend beyond the main conduit on both sides with respect to the axis of rotation. Thus, as illustrated in FIG. 1C, the flow control member 25 may include a first end portion 25a, which is located beyond one side of the main conduit 22 in the direction of the axis of rotation, and a second end portion 25b, which is located beyond the other side of the main conduit 22 in the direction of the axis of rotation. Such an arrangement may assist in rotatably mounting to the flow control member 25.

As is illustrated in FIGS. 1A-1C, in some embodiments, the axis of rotation for the flow control member 25 may, in addition to being perpendicular to the length of the main conduit 22, be perpendicular to the length of the dumping conduit 27, also.

While the arrangements described above may be appropriate in some embodiments, for example because they are particularly compact, they are by no means essential. Indeed, it is to be understood that it is by no means essential that flow control member 25 is rotatable about an axis. Consequently, in other embodiments, the movement of flow control member 25 between the flow controlling positions and the flow diverting position might be a pure translation (i.e. without rotation) or might be a combination of a rotation and a translation.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. An extrusion system comprising:
an extruder, operable to propel extrudate through an outlet thereof, during use; and
a valve, which comprises:
an inlet, fluidically connected to the extruder outlet, so as to receive extrudate therefrom, during use;
a main conduit extending from the inlet to a main outlet;
a dumping conduit, extending from a junction with the main conduit to a dumping outlet;
a flow control member, operable to move between:
a plurality of flow controlling positions, in which extrudate is directed to the main outlet, with the flow control member providing, for each flow controlling position, a respective amount of impedance to flow along the main conduit; and
a flow diverting position, in which extrudate is directed along the dumping conduit to the dumping outlet;
at least one seal for the flow control member; and
at least one port for receiving a fluid to flush the at least one seal.

2. The extrusion system of claim 1, wherein the flow control member is rotatable about an axis to move between said flow controlling positions and said flow diverting position.

3. The extrusion system of claim 2, wherein said axis is perpendicular to a length of the main conduit.

4. The extrusion system of claim 3, wherein said axis is perpendicular to a length of the dumping conduit.

5. The extrusion system of claim 2, wherein the flow control member comprises a flow-contacting surface, wherein each of said flow controlling positions corresponds to the flow-contacting surface being oriented at a respective angle with respect to a length of the main conduit.

6. The extrusion system of claim 2, wherein a cross-section of the flow control member, taken in a plane defined by length directions of the main and dumping conduits, is shaped generally as a segment of a circle.

7. The extrusion system of claim 1, wherein the valve is configured as a heat exchanger, comprising at least one conduit for conveying a heat transfer fluid to exchange heat with extrudate within the main conduit.

8. The extrusion system of claim 7, wherein the heat transfer fluid is steam, water or oil.

9. The extrusion system of claim 1, wherein the valve further comprises a heater for heating extrudate passing through said main conduit.

10. The extrusion system of claim 1, wherein said plurality of flow controlling positions comprises an open position, in which the flow control member presents a minimum amount of impedance for the plurality of flow controlling positions, and in which at least one flow-contacting surface of the flow control member is substantially continuous with one or more adjoining internal surfaces of the main conduit.

11. The extrusion system of claim 1, wherein the flow control member is further operable to move to a pressure release position, in which the extruder outlet, the main outlet, and the dumping outlet are all in fluid communication.

12. A valve for an extrusion system comprising:
   an inlet, configured for connection to an outlet of an extruder, so as to receive extrudate therefrom, during use;
   a main conduit extending from the inlet to a main outlet;
   a dumping conduit, extending from a junction with the main conduit to a dumping outlet;
   a flow control member, operable to move between:
      a plurality of flow controlling positions, in which extrudate is directed to the main outlet, with the flow control member providing, for each flow controlling position, a respective amount of impedance to flow along the main conduit; and
      a flow diverting position, in which extrudate is directed along the dumping conduit to the dumping outlet,
   at least one seal for the flow control member; and
   at least one port for receiving a fluid to flush the at least one seal.

13. The valve of claim 12, wherein the flow control member is rotatable about an axis to move between said flow controlling positions and said flow diverting position.

14. The valve of claim 13, wherein said axis is perpendicular to a length of the main conduit.

15. The valve of claim 13, wherein the flow control member comprises a flow-contacting surface, wherein each of said flow controlling positions corresponds to the flow-contacting surface being oriented at a respective angle with respect to a length of the main conduit.

16. The valve of claim 13, wherein a cross-section of the flow control member, taken in a plane defined by length directions of the main and dumping conduits, is shaped generally as a segment of a circle.

* * * * *